United States Patent

Loehr

[11] Patent Number: 6,035,619
[45] Date of Patent: Mar. 14, 2000

[54] COMBINATION GEARBOX DRIVE SYSTEM FOR A DISC MOWER CONDITIONER

[75] Inventor: Thomas J. Loehr, Mt. Calvary, Wis.

[73] Assignee: Gehl Company, West Bend, Wis.

[21] Appl. No.: 09/017,305

[22] Filed: Feb. 2, 1998

[51] Int. Cl.[7] .................................................. A01D 55/262
[52] U.S. Cl. ................................. 56/13.6; 56/6; 56/16.4 R
[58] Field of Search ........................... 56/1, 6, 7, 16.4 B, 56/13.9, 13.6, DIG. 11, 10.2 H, 16.4 R

[56] References Cited

U.S. PATENT DOCUMENTS

| | | |
|---|---|---|
| 3,550,360 | 12/1970 | Van der Lely . |
| 4,185,445 | 1/1980 | Van der Lely . |
| 4,199,922 | 4/1980 | Van der Lely . |
| 4,468,916 | 9/1984 | Vissers et al. . |
| 4,502,268 | 3/1985 | Kulak . |
| 4,719,742 | 1/1988 | Ermacora et al. . |
| 4,724,660 | 2/1988 | Bowie et al. . |
| 4,759,172 | 7/1988 | Purrer et al. . |
| 4,815,262 | 3/1989 | Koch et al. . |
| 4,833,868 | 5/1989 | Ermacora et al. . |
| 4,838,014 | 6/1989 | Koch et al. . |
| 4,848,069 | 7/1989 | Ermacora et al. . |
| 4,858,418 | 8/1989 | Von Allwoerden . |
| 4,860,526 | 8/1989 | Hottes . |
| 4,860,527 | 8/1989 | Maarten . |
| 4,879,870 | 11/1989 | Neuerburg . |
| 4,887,416 | 12/1989 | Crane et al. . |
| 4,888,939 | 12/1989 | Crane . |
| 4,890,445 | 1/1990 | Crane . |
| 4,896,484 | 1/1990 | Jennings . |
| 4,899,523 | 2/1990 | Frumholtz et al. . |
| 4,947,629 | 8/1990 | Ermacora et al. . |
| 5,031,391 | 7/1991 | Meijering . |
| 5,107,662 | 4/1992 | Haberkorn et al. . |
| 5,113,640 | 5/1992 | Colistro . |
| 5,140,804 | 8/1992 | Gleeson . |
| 5,172,539 | 12/1992 | Jennnings et al. . |
| 5,179,822 | 1/1993 | McLean . |
| 5,280,696 | 1/1994 | Quataert et al. . |
| 5,321,938 | 6/1994 | LeBlanc . |
| 5,345,752 | 9/1994 | Pruitt et al. . |
| 5,357,737 | 10/1994 | Ermacora et al. . |
| 5,421,145 | 6/1995 | Pruitt et al. . |
| 5,430,997 | 7/1995 | O'Halloran et al. . |
| 5,433,064 | 7/1995 | Schmitt et al. . |
| 5,463,852 | 11/1995 | O'Halloran et al. . |

*Primary Examiner*—Robert E. Pezzuto
*Attorney, Agent, or Firm*—Andrus, Sceales, Starke & Sawall

[57] ABSTRACT

A center pivot mower conditioner includes an input driveline connected directly to a power transfer arrangement forming a part of the mower conditioner for providing input power to the cutterhead assembly and to the conditioning roll drive arrangement. The power transfer arrangement is in the form of a gearbox having a stationary lower section fixed to the frame of the mower conditioner, and an upper section pivotably mounted to the lower section for movement about a substantially vertical pivot axis. The driveline provides input power to the gearbox upper section, which is transferred to the lower section through a vertical pinion shaft. The vertical pinion shaft is connected to the cutterhead assembly for providing input power to the cutterhead assembly. The gearbox is preferably located toward the center of the mower conditioner, to provide input power to the cutterhead assembly substantially in the center of the cutterhead assembly. The stationary lower section of the gearbox includes a gear arrangement providing output power to a horizontal output shaft. A conditioning system drive shaft extends between the output shaft and the conditioning system drive arrangement, for providing input power to the conditioning system drive arrangement through the gearbox.

14 Claims, 6 Drawing Sheets

COMBINATION GEARBOX DRIVE SYSTEM FOR A DISC MOWER CONDITIONER

BACKGROUND AND SUMMARY OF THE INVENTION

This invention relates to a mower conditioner, and more particularly to a drive arrangement for driving both the cutting mechanism and the conditioning arrangement of a mower conditioner.

A mower conditioner for cutting and conditioning agricultural crop material typically includes a tongue adapted for connection to a tractor for pulling the mower conditioner behind the tractor. The tongue supports a rotatable driveline which is interconnected with the tractor power take off for providing input power to the mower conditioner. Many mower conditioners have the tongue mounted to one side of the mower conditioner. A cutterbar drive system and a conditioner drive system are mounted to the same side of the machine as the tongue, and the driveline is interconnected with the cutting mechanism drive system and the conditioner drive system. This arrangement functions well for mower conditioners. It is also known to connect the tongue inwardly of the sides of the machine, for example at or near the center of the machine. With this arrangement, it is necessary to transfer input power from at or near the center of the machine to both the cutting mechanism and the crop conditioning mechanism.

One solution to this problem is shown in Jennings et al U.S. Pat. No. 5,172,539. This patent discloses a drive system for a mower conditioner having a bevel gearbox which receives input power from the driveline. A vertical drive shaft extends downwardly from the gearbox and is connected to an intermediate cutting unit, which is provided on a cutterbar having a series of cutting units including a pair of end cutting units between which the intermediate cutting unit is located. A horizontal output shaft extends from the gearbox and is interconnected with a transmission for rotating the conditioning rolls. In this patent, the shaft providing input power to the gearbox is fixed in position, and a flexible coupling is interposed between the input shaft and the driveline. With this arrangement, the range of angular movement of the tongue is limited by the flexible coupling.

Pruitt et al U.S. Pat. No. 5,272,859 discloses a center pivot mower conditioner which includes a central pivotable gearbox which receives rotary input power from the driveline. The gearbox provides output power to a pair of pulleys. One of the pair of pulleys is drivingly interconnected with a vertical drive shaft located at one side of the machine for providing power to the cutterbar, and the other of the pair of pulleys is drivingly interconnected with another vertical drive shaft located at an opposite end of the machine for providing power to the conditioning rolls.

It is an object of the present invention to provide a mower conditioner drive system having a center drive arrangement for providing input power to the cutterbar of the mower conditioner, in combination with a drive shaft for delivering power from the center drive arrangement to a conditioning system. It is a further object of the invention to provide such a drive system which utilizes a pivoting gearbox arrangement to maximize the range of angular movement of the mower conditioner header relative to the tongue. Yet another object of the invention is to provide such a drive system which is relatively simple in its components and operation to provide advantages in manufacturing costs and serviceability, while maximizing efficiency in transferring power from the input shaft to the cutterbar and the conditioning system.

In accordance with one aspect of the invention, a mower conditioner includes a frame which defines opposed sides and which carries a cutterbar having a series of individual rotatable cutting units including a pair of laterally spaced end cutting units and at least a first intermediate cutting unit disposed between the end cutting units. The cutterbar includes a cutterbar power transfer arrangement interconnected with the first intermediate cutting unit and the end cutting units, as well as with any intermediate cutting units therebetween, for rotating the cutting units together. The mower conditioner further includes a conditioning arrangement for conditioning crop material cut by the cutting units, and a rotatable power input located between the opposed sides of the frame. The invention resides in an improvement in the form of a power transfer arrangement interconnected with the rotatable power input and including a first rotatable output and a second rotatable output. A generally vertical first drive arrangement is interposed between the first rotatable output and the first intermediate cutting unit, for rotating the first intermediate cutting unit and to thereby cause rotation of the end cutting units, and any intermediate cutting units between the end cutting units and the first intermediate cutting unit through the cutterbar power transfer arrangement. The power transfer arrangement further includes a generally horizontal second drive arrangement interposed between the second rotatable output and the conditioning arrangement for driving the conditioning arrangement. The power transfer arrangement is in the form of a gearbox defining a fixed position power output section and a pivotable power input section pivotably mounted to the power output section. The power input to the gearbox is preferably in the form of an input shaft connected to the pivotable power input section. The first power output may be associated with either the pivotable input section or the fixed position power output section, and the second rotatable power output is associated with the fixed position power output section. The gearbox includes a gear mechanism for imparting rotation to both the first and second power outputs in response to rotation of the input shaft. The first power output is preferably in the form of a substantially vertical output member with which the generally vertical first drive arrangement is interconnected. The second power output is preferably in the form of a substantially horizontal output member with which the generally horizontal second drive arrangement is interconnected. The second drive arrangement is in the form of a horizontal drive shaft which extends between the second power output and one side of the frame, to provide input power to a drive arrangement carried by the frame and interconnected with the conditioning arrangement for driving the conditioning arrangement. The gear mechanism includes a vertical drive shaft rotatably mounted to the pivotable power input section for rotation in response to rotation of the input shaft, and the substantially vertical output member is mounted to the power output section and interconnected with the vertical drive shaft. The gear mechanism further includes a horizontal output member mounted to the power output section, which includes a drive gear arrangement for imparting rotation to the horizontal output member in response to rotation of the vertical drive shaft.

The invention further contemplates an agricultural machine in the form of a mower conditioner substantially in accordance with the foregoing summary, as well as a power transfer arrangement for a mower conditioner, also substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
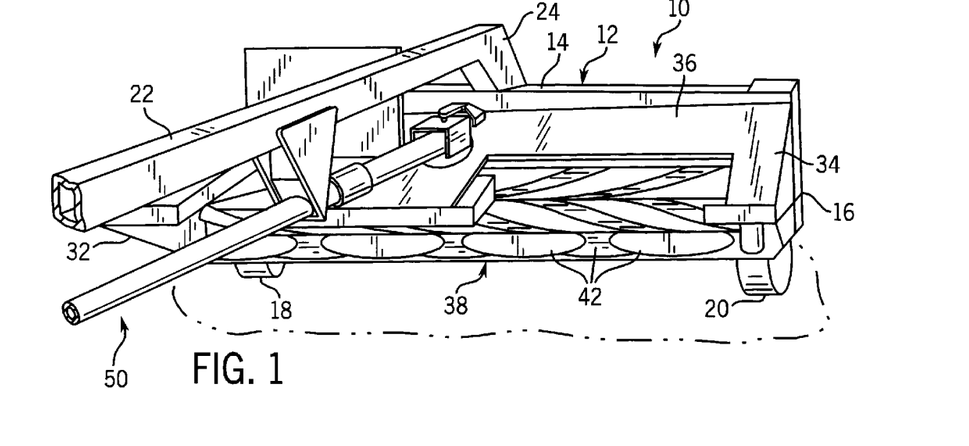
FIG. 1 is a partial isometric view of a tractor-towed, swing tongue mower conditioner provided with the power transfer arrangement constructed in accordance with the present invention.
Figure 2:
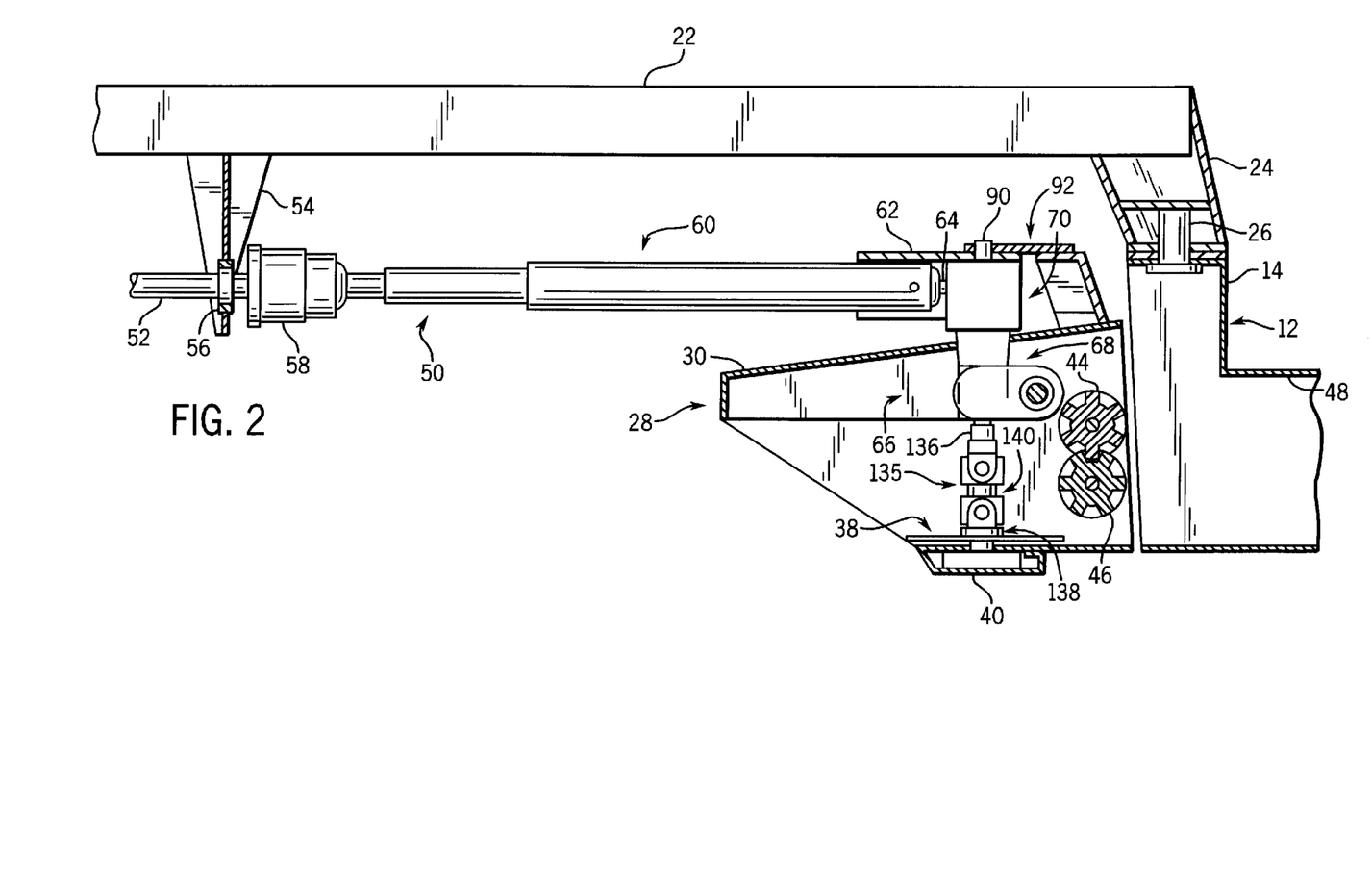
FIG. 2 is a partial longitudinal section view of the mower conditioner of FIG. 1.
Figure 2A:
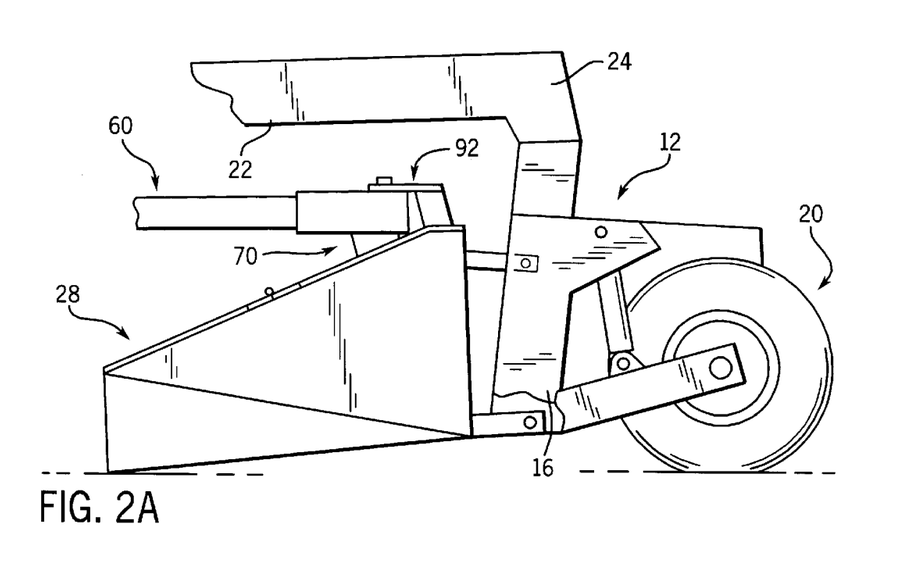
FIG. 2A is a side elevation view of the mower conditioner of FIG. 1.

Referring to FIGS. 1, 2 and 2A, an agricultural machine in the form of a mower conditioner 10 is provided for cutting and conditioning agricultural crop material. Mower conditioner 10 generally includes an inverted U-shaped frame 12 having an upper transverse cross-member 14 and a pair of depending support legs 16 at opposite ends of cross member 14, with only one of legs 16 being visible in FIG. 1. A pair of ground-engaging wheels 18, 20 are secured to the lower ends of legs 16 for mobilizing frame 12, such wheels 18, 20 being capable of use on a variety of grades and terrains. Frame 12 is adapted for towing movement through an elongated beam-like tongue or drawbar 22 having a hitch at its forward end for connection to the hitch of a tractor, in a manner as is known. At the opposite end, tongue 22 includes a downwardly extending neck portion 24 which is pivotably attached to the center of cross-member 14 by a cylindrical spindle 26 (FIG. 2) to define a vertical pivot axis about which frame 12 is pivotable relative to tongue 22.

Tongue 22 may be swung relative to frame 12 to any number of angular positions for enabling mower conditioner 10 to be towed behind and to the side of a tractor and for enabling mower conditioner 10 to be turned.

A harvesting header 28 is supported by frame 12 under tongue 22. It should be appreciated that header 28 may be configured in any number of different arrangements to perform the desired function. In the illustrated embodiment, header 28 is designed to both mow or sever standing crop material and to then condition the cut crop material prior to discharging it in a windrowed or swathed condition. In accordance with conventional construction, header 28 is pivotably mounted to frame 12 for movement about a substantially horizontal pivot axis between raised and lowered positions.

Header 28 includes a box-like rectangular frame 30 including a pair of side sections 32, 34 which are spanned by a cover plate 36 located forwardly of and angling downwardly relative to a cross-member, as is known. A transverse cutterhead 38 is supported by a transverse cutterhead support member 40 which extends between and interconnects the lower ends of side sections 32, 34, in a manner such that the header frame has closed upper, lower and side portions but defines an open crop-receiving mouth between side sections 32, 34.

Cutterhead 38 includes a series of individual disc-type cutting units 42 spaced along its length. In a manner as is known, cutting units 42 are rotatable in unison with each other via a chain or gear drive arrangement forming a part of cutterhead 38. In this manner, rotation of any one of cutting units 42 is translated into rotation of all cutting units 42. Cutterhead 38 has a cutting unit 42 located adjacent each of side members 32 and 34, and a series of intermediate cutting units 42 located between the end cutting units 42.

As a means for conditioning crop material cut by cutterhead 38, a pair of crop conditioning rolls 44, 46 extend across header 28 rearwardly of cutterhead 38, for receiving crop material cut by cutting units 42 and crimping or conditioning the crop material before it is fed rearwardly through a discharge chute 48 to the ground.

Referring to FIGS. 1 and 2, a mechanical driveline 50 extends along and is supported by tongue 22 for transmitting rotary power from the power take off of a tractor to cutterhead 38 and to conditioning rolls 44 and 46. Driveline 50 includes a fixed position forward portion 52 suspended beneath tongue 22 by a hanger or pedestal 54 having a bearing 56 which encircles fixed position portion 52. Fixed position portion 52 is connected to a constant velocity joint 58, which is connected to a telescoping power input assembly 60. The details of construction of power input assembly 60 are shown and described in co-pending application Ser. No. 08/920,582 filed Aug. 29, 1997, the disclosure of which is hereby incorporated by reference. Power input assembly 60 is connected to a gearbox housing 62, which includes a power input shaft 64.

In accordance with the present invention, a power transfer arrangement 66 is interconnected with driveline input shaft 64 for transferring power from input shaft 64 to cutterhead 38 and to conditioning rolls 44, 46. Power transfer arrangement 66 is in the form of a gearbox having a fixed-position lower section 68 mounted to header frame 30, and a pivotable upper section 70 mounted to lower section 68 for pivoting movement about a substantially vertical pivot axis.

Figure 3:
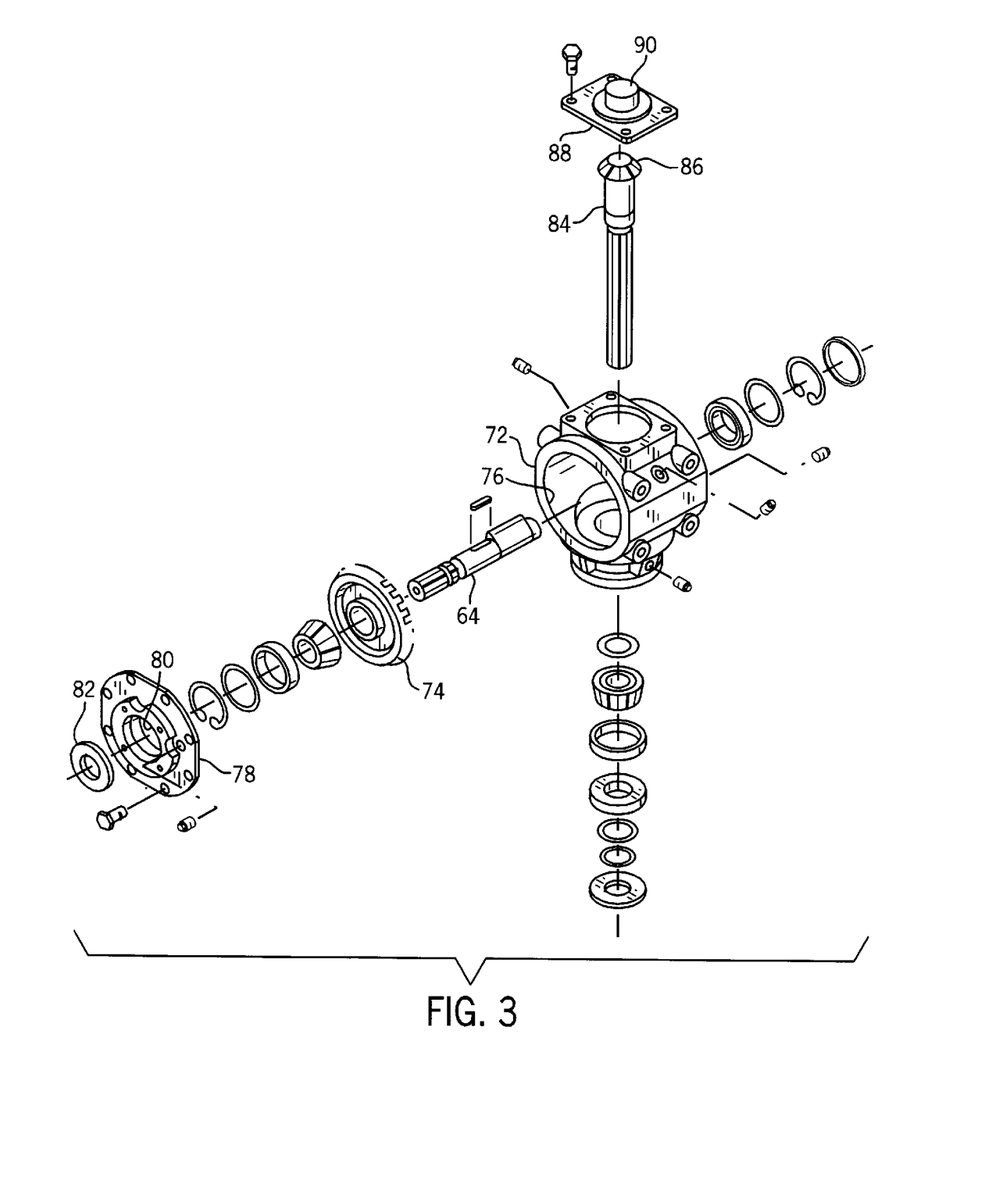
FIG. 3 is an exploded isometric view illustrating the components of the upper pivoting section of a gearbox forming a part of the power transfer arrangement for the mower conditioner of FIGS. 1 and 2.

Referring to FIG. 3, gearbox upper section 70 includes a housing 72 defining an internal cavity. Input shaft 64 extends into the internal cavity defined by housing 72, and a bevel gear 74 is connected to input shaft 64. Housing 72 defines a front opening 76, and a cover plate 78 is engaged with housing 72 over opening 76. Input shaft 64 extends through a passage 80 formed in cover 78, and a seal 82 is interposed between input shaft 64 and the wall defining passage 80.

An output pinion shaft 84 extends vertically through the internal cavity defined by housing 72, and a bevel gear 86 is mounted to the upper end of pinion shaft 84. The lower portion of output pinion shaft 84 is splined, and extends outwardly of housing 72 through a vertical, downwardly opening passage formed in the lower end of housing 72.

A top cover 88 is mounted to the upper end of housing 72, and includes a hub 90 concentric with the longitudinal axis of output pinion shaft 84. As shown in FIG. 2, hub 90 is journalled in an arm structure 92. In this manner, gearbox upper section 70 is pivotably mounted to header frame 30. Telescoping power input assembly 60 is connected to gearbox housing 72 so as to provide pivoting movement of gearbox upper section 70 about a substantially vertical pivot axis defined by hub 90, in response to swinging movement of tongue 22 relative to mower conditioner frame 12. In this manner, rotary input power is provided to gearbox upper section 70 through input shaft 64 throughout the range of angular movement of tongue 22 relative to mower conditioner frame 12.

Figure 4:
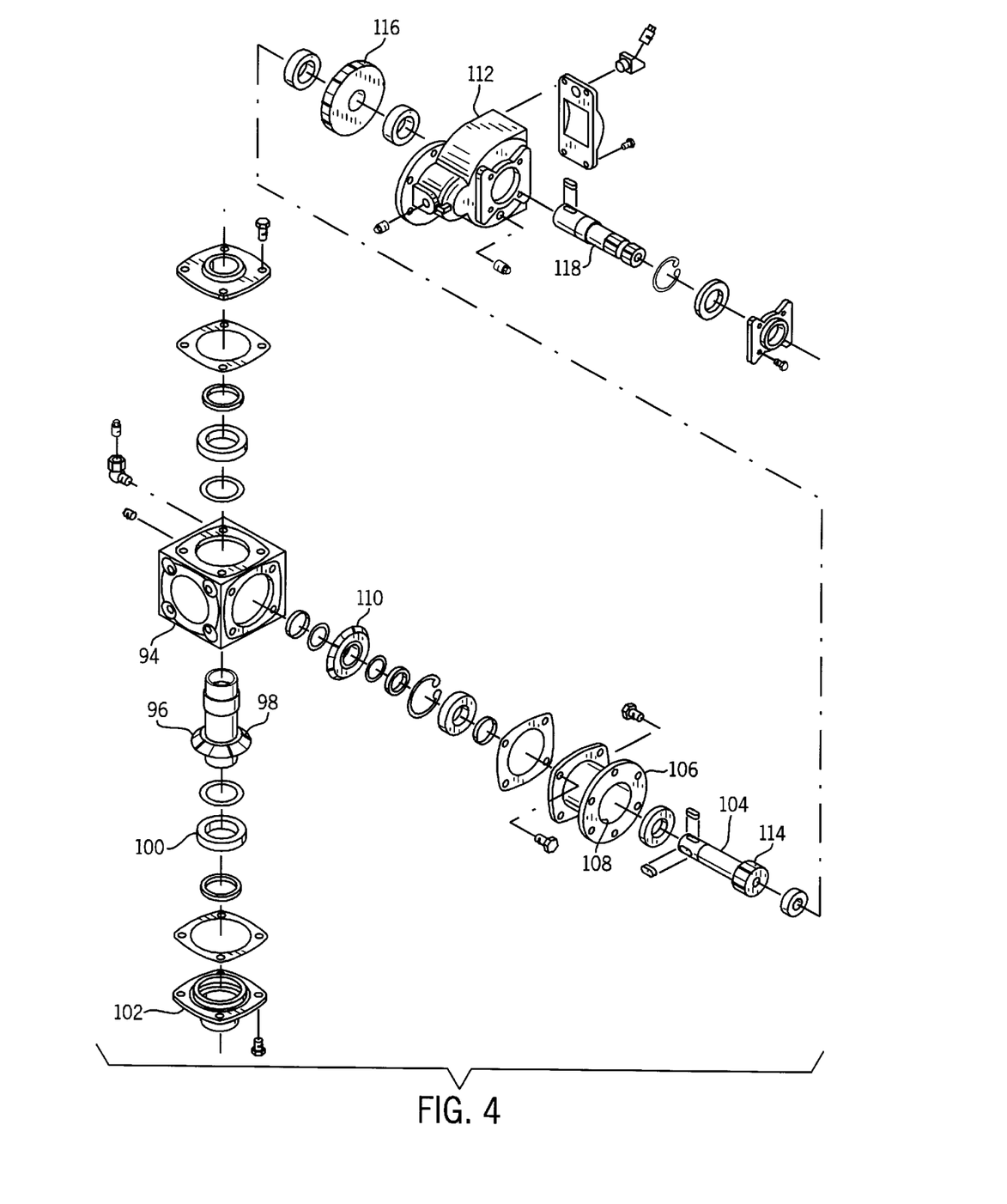
FIG. 4 is an exploded isometric view of the components of a fixed-position lower portion of a gearbox forming the power transfer arrangement for the mower conditioner of FIGS. 1 and 2.

Referring to FIG. 4, fixed-position gearbox lower section 68 includes a casing 94 mounted to header frame 30 and defining an internal cavity. The lower, splined portion of output pinion shaft 84 extends into the internal cavity defined by casing 94, and a hollow pinion shaft 96 defines a splined internal passage which receives and engages the splines of output pinion shaft 84. A bevel gear 98 is mounted to pinion shaft 96, and a bearing 100 is disposed between bevel gear 98 and a bottom cover 102 which encloses the lower wall of casing 94 and supports pinion shaft 96.

A horizontal pinion shaft 104 extends into the internal cavity of casing 94 through an opening formed in a side wall of casing 94, over which a shaft housing 106 defining a passage 108 is positioned. A bevel gear 1 10 is mounted to pinion shaft 104, and is engaged with bevel gear 98. In this manner, pinion shaft 104 is rotatably driven in response to rotation of pinion shaft 96.

A gear reduction housing 112 is mounted to the outer end of pinion shaft housing 106, and a drive gear 114 mounted to the end of pinion shaft 104 is received within an internal cavity defined by gear reduction housing 112. A driven gear 116 is also rotatably mounted within the internal cavity of gear reduction housing 112, and defines teeth which mesh with the teeth of drive gear 114 so as to rotate driven gear 116 in response to rotation of drive gear 114. Driven gear 116 is mounted to the end of an output shaft 118, which extends horizontally outwardly from gear reduction housing 112.

Figure 5:
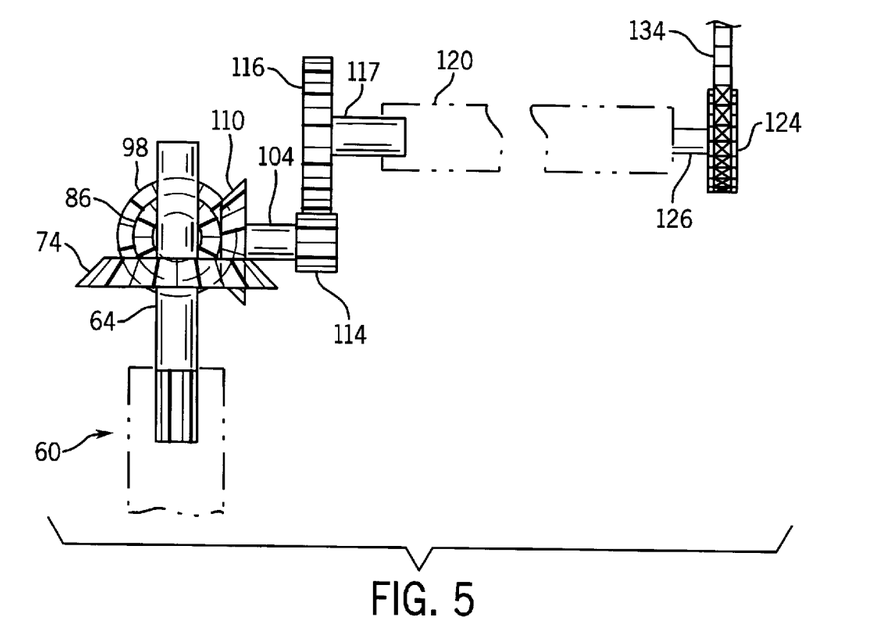
FIG. 5 is a schematic top plan view illustrating the assembled components of the upper and lower gearbox portions of FIGS. 3 and 4.
Figure 6:
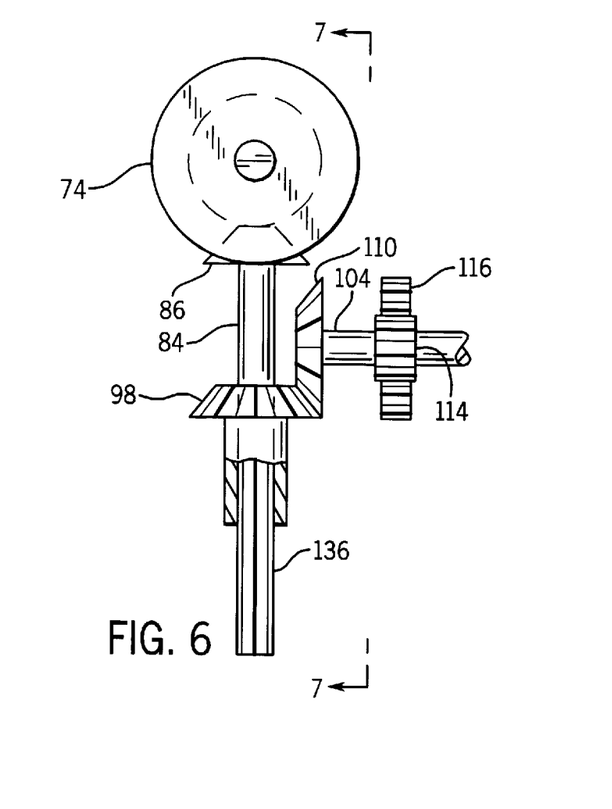
FIG. 6 is a front elevation view, with portions in section, showing the gearbox components of FIG. 5.
Figure 7:
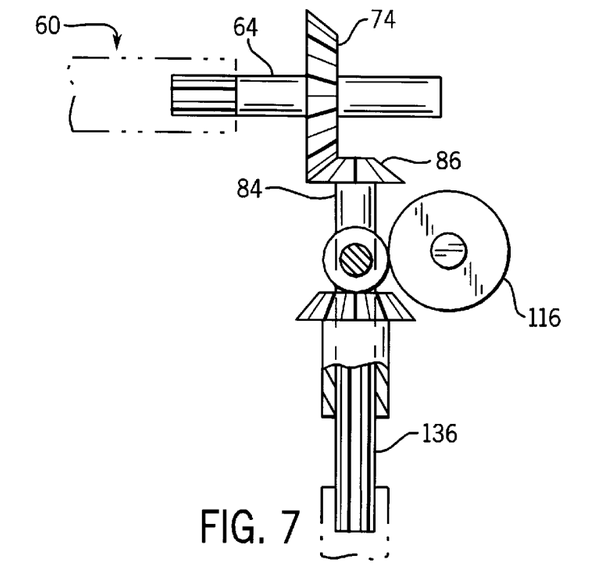
FIG. 7 is a side elevation view, partially in section, showing the gearbox components of FIGS. 5 and 6.
Figure 8:
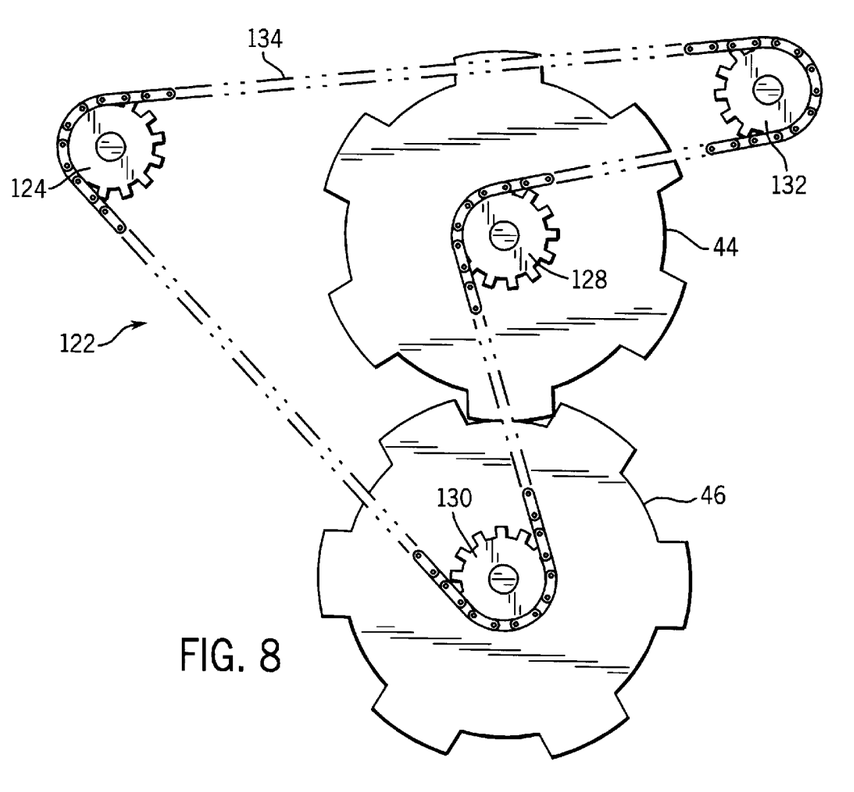
FIG. 8 is a side elevation view of a drive system forming a part of the mower conditioner of FIG. 1 for powering a conditioning system, such as a set of conditioning rolls.

As shown in FIG. 5, output shaft 118 is connected to a horizontal drive shaft 120, which extends between gearbox lower section 68 and side section 34. A conditioning roll drive arrangement, shown at 122 in FIG. 8, is housed within side section 34. Conditioning roll drive arrangement 122 includes a drive sprocket 124 drivingly interconnected with drive shaft 120 through a stub shaft 126, in combination with a pair of driven sprockets 128, 130 mounted to conditioning rolls 44, 46, respectively. Conditioning roll drive arrangement 122 further includes an idler sprocket 132, and a chain 134 trained about sprockets 124, 128, 130 and 132. In this manner, rotary power from drive shaft 120 is transferred to drive sprocket 124, and through chain 134 to driven sprockets 128, 130 for imparting rotation to conditioning rolls 44 and 46 in response to rotation of drive shaft 120.

As shown in FIG. 2, a vertical cutterhead drive shaft assembly 135 is interconnected between vertical pinion shaft 84 and cutterhead 38. Cutterhead drive shaft assembly 135 includes a splined input yoke 136, a double yoke 140 and a lower yoke 138. Lower yoke 138 is drivingly engaged with cutterbar assembly 38, for providing input power to cutterbar assembly 38 in response to rotation of pinion shaft 84. With this arrangement, input power is provided to cutterhead assembly 38 at an intermediate one of cutting units 42, preferably a cutting unit 42 disposed substantially in the center of cutterhead assembly 38. As noted previously, cutterhead assembly 38 includes a power transmission arrangement which functions to rotate all cutting units 42 in response to rotation of one of cutting units 42.

With the arrangement as shown and described, power transfer arrangement 66 provides the shortest path possible between driveline power input shaft 64 and cutterhead assembly 38, thus reducing the length of the heavy duty drive components necessary to transfer power from power input shaft 64 to cutterhead assembly 38. This simplifies construction of the mower conditioner side sections such as 34, 36, in that the components for transferring power to cutterhead assembly 38 are not housed within side sections 32, 34. Further, the components providing input power to conditioning roll drive arrangement 122 can be of relatively small size, since significantly less power is required to drive conditioning rolls 44, 46 than is required to drive all driven components of the machine, as was the case in the prior art. This provides a reduction in the cost and complexity for transferring power to the conditioning roll drive arrangement. Further, the provision of a gear reduction mechanism between the gearbox and conditioning roll drive shaft 120 provides a simple and inexpensive arrangement for providing the appropriate amount of input power to conditioning roll drive arrangement 122 and at an appropriate speed as desired.

In addition, the construction of the power transfer arrangement gearbox, utilizing an upper pivoting section 70 mounted to a lower stationary section 68, enables power to be Input directly to the gearbox without the need for a constant velocity joint between the driveline and the gearbox, which otherwise can limit the range of pivoting movement between the driveline and the mower conditioner. The power transfer arrangement nonetheless maintains an efficient and effective transfer of input power to the cutterhead assembly and to the conditioning roll drive arrangement.

Various alternatives and embodiments are contemplated as being within the scope of the following claims particularly pointing out and distinctly claiming the subject matter regarded as the invention.

I claim:

1. In a mower conditioner including a frame defining opposed sides and carrying a cutterbar having a series of individual rotatable cutting units including a pair of laterally spaced end cutting units and at least one intermediate cutting unit disposed between the end cutting units, a cutterbar power transfer arrangement interconnected with the at least one intermediate cutting unit and the end cutting units for rotating the cutting units together, a conditioning arrangement for conditioning crop material cut by the cutting units, and a rotatable power input located between the opposed sides of the frame, the improvement comprising:

a power transfer arrangement interconnected with the rotatable power input, the power transfer arrangement including a first rotatable output and a second rotatable output;

a generally vertical first drive arrangement interposed between the first rotatable output and the at least one intermediate cutting unit for rotating the intermediate cutting unit to thereby cause rotation of the end cutting units through the cutterbar power transfer arrangement; and a generally horizontal second drive arrangement interposed between the second rotatable output and the conditioning arrangement for driving the conditioning arrangement.

2. The improvement of claim 1, wherein the power transfer arrangement comprises a gearbox defining a fixed position power outlet section and a pivotable power input section pivotably mounted to the power output section, wherein the power input comprises an input shaft connected to the pivotable power input section and wherein the first and second rotatable power outputs are associated with the fixed position power output section.

3. The improvement of claim 2, wherein the gearbox includes a gear mechanism for imparting rotation to both the first and second power outputs in response to rotation of the input shaft.

4. The improvement of claim 3, wherein the first power output comprises a substantially vertical output member with which the generally vertical first drive arrangement is interconnected, and wherein the second power output comprises a substantially horizontal output member with which the generally horizontal second drive arrangement is interconnected.

5. The improvement of claim 4, wherein the generally horizontal second drive arrangement includes a substantially horizontal drive shaft extending between the second power output and one side of the frame, wherein the substantially horizontal drive shaft provides input power to a drive arrangement carried by the frame and interconnected with the conditioning arrangement for driving the conditioning arrangement.

6. The improvement of claim 4, wherein the gear mechanism includes a vertical drive shaft rotatably mounted to the gearbox pivotable power input section for rotation in response to rotation of the input shaft, a vertical output member mounted to the power output section and engaged with the vertical drive shaft for rotation in response to rotation of the vertical drive shaft, a horizontal output member mounted to the power output section, and a drive gear arrangement mounted to the power output section for imparting rotation to the horizontal output member in response to rotation of the vertical drive shaft.

7. An agricultural machine, comprising:
   a frame defining opposed sides;
   a cutterbar carried by the frame and including a series of individual rotatable cutting units including a pair of laterally spaced end cutting units and at least one intermediate cutting unit disposed between the end cutting units, and further including a cutterbar power transfer arrangement interconnected with the at least one intermediate cutting unit and the end cutting units for rotating the cutting units together;
   a conditioning arrangement for conditioning crop material cut by the cutting units;
   a rotatable power input located between the opposed sides of the frame;
   a power transfer arrangement interconnected with the rotatable power input, and including a first rotatable output and a second rotatable output;
   a generally vertical first drive arrangement interposed between the first rotatable output and the at least one intermediate cutting unit for rotating the intermediate cutting unit to thereby cause rotation of the end cutting units through the cutterbar power transfer arrangement; and
   a generally horizontal second drive arrangement interposed between the second rotatable output and the conditioning arrangement for driving the conditioning arrangement.

8. The agricultural machine of claim 7, wherein the conditioning arrangement comprises a pair of conditioning rolls carried by the frame and including a conditioning roll drive arrangement, and wherein the generally horizontal second drive arrangement comprises a generally horizontal drive shaft extending between the second rotatable output and the conditioning roll drive arrangement for providing input power to the conditioning roll drive arrangement.

9. The agricultural machine of claim 8, wherein the first rotatable output comprises a substantially vertical first output member interconnected with the generally vertical first drive arrangement and wherein the second rotatable output comprises a substantially horizontal second output member interconnected with the generally horizontal drive shaft.

10. The agricultural machine of claim 9, wherein the power transfer arrangement comprises a gearbox defining a pivotable power input section pivotably mounted to a fixed position power output section, wherein the substantially vertical first output member and the substantially horizontal second output member are associated with the fixed position power output section.

11. A power transfer arrangement for a mower conditioner including a frame defining a pair of opposed sides, a cutterbar defining a pair of opposed ends, a conditioning arrangement for conditioning crop material cut by the cutterbar, and a rotatable power input located between the opposed sides of the frame, comprising:
    a power transfer gearbox including a fixed position lower portion and an upper portion pivotably mounted to the lower portion, wherein the upper portion includes a rotatable power input and wherein the lower portion includes first and second rotatable power outputs rotatable in response to the rotatable power input;
    a first drive arrangement adapted for interconnection between the first power output and the cutterbar intermediate the opposed ends of the cutterbar for driving the cutterbar in response to rotation of the first power output; and
    a second drive arrangement adapted for interconnection between the second power output and the conditioning arrangement for driving the conditioning arrangement in response to rotation of the second power output.

12. The power transfer arrangement of claim 11, wherein the first and second rotatable power outputs are substantially perpendicular to each other.

13. The power transfer arrangement of claim 12, wherein the first rotatable power output comprises a substantially vertical rotatable output member and wherein the second rotatable power output comprises a substantially horizontal rotatable output member, and wherein the gearbox lower portion includes a gear arrangement for imparting rotation to both the substantially vertical rotatable output member and the substantially horizontal rotatable output member in response to the rotatable power input.

14. The power transfer arrangement of claim 13, wherein the second drive arrangement comprises a substantially horizontal drive shaft adapted for interconnection with the substantially horizontal output member and a drive mechanism associated with the conditioning arrangement.

* * * * *